United States Patent
Ryan

[15] 3,702,434
[45] Nov. 7, 1972

[54] POWER SUPPLY SYSTEM AND CONTROL CIRCUITS THEREFOR

[72] Inventor: William H. Ryan, Toledo, Ohio
[73] Assignee: Owens-Illinois, Inc.
[22] Filed: Dec. 18, 1970
[21] Appl. No.: 99,497

[52] U.S. Cl. ..........................323/20, 321/2, 321/18, 323/21, 323/22 T, 323/38
[51] Int. Cl...............................................G05f 1/44
[58] Field of Search ..........321/2, 16, 18; 323/21, 20, 323/22 T, 17, 31, 38

[56] References Cited

UNITED STATES PATENTS

| | | | |
|---|---|---|---|
| 3,426,290 | 2/1969 | Jensen | 321/18 UX |
| 3,564,384 | 2/1971 | Adler | 321/2 |
| 3,559,030 | 1/1971 | Bussard | 321/18 X |
| 3,431,427 | 3/1969 | Pahl, Jr. | 323/21 X |

OTHER PUBLICATIONS

Transistor Circuit Design by Texas Instruments Inc. Pub. McGraw-Hill Co., Inc.; Pgs. 450 & 451

*Primary Examiner*—Gerald Goldberg
*Attorney*—Donald K. Wedding and E. J. Holler

[57] ABSTRACT

There is disclosed a regulated power supply system wherein an alternating current supply voltage is converted to a direct current voltage, which is regulated and applied to a converter, the converter including a pair of switching transistors for switching current through a linear transformer core and a further pair of switching transistors connected as a push-pull saturable reactor oscillator or inverter for supplying switching potentials to the first pair of transistors. A zener reference diode is used to sense over-voltage conditions to a load and automatically adjust a switching transistor in the regulator to adjust the voltage to the load. In accordance with the invention, one or more switching devices are connected across the zener diode, one of which is operated in accordance with signals from a computer or other low level signal source so as to turn on and turn off the power supply and the other of which is connected to a current sensing resistor for shunting the reference zener diode on current overloads. A further feature of the invention is in the overall system of conversion wherein power for the saturable reactor inverter and other operating potentials for the regulating circuit are derived from the regulator circuit per se, thereby improving the efficiency of the system.

4 Claims, 1 Drawing Figure

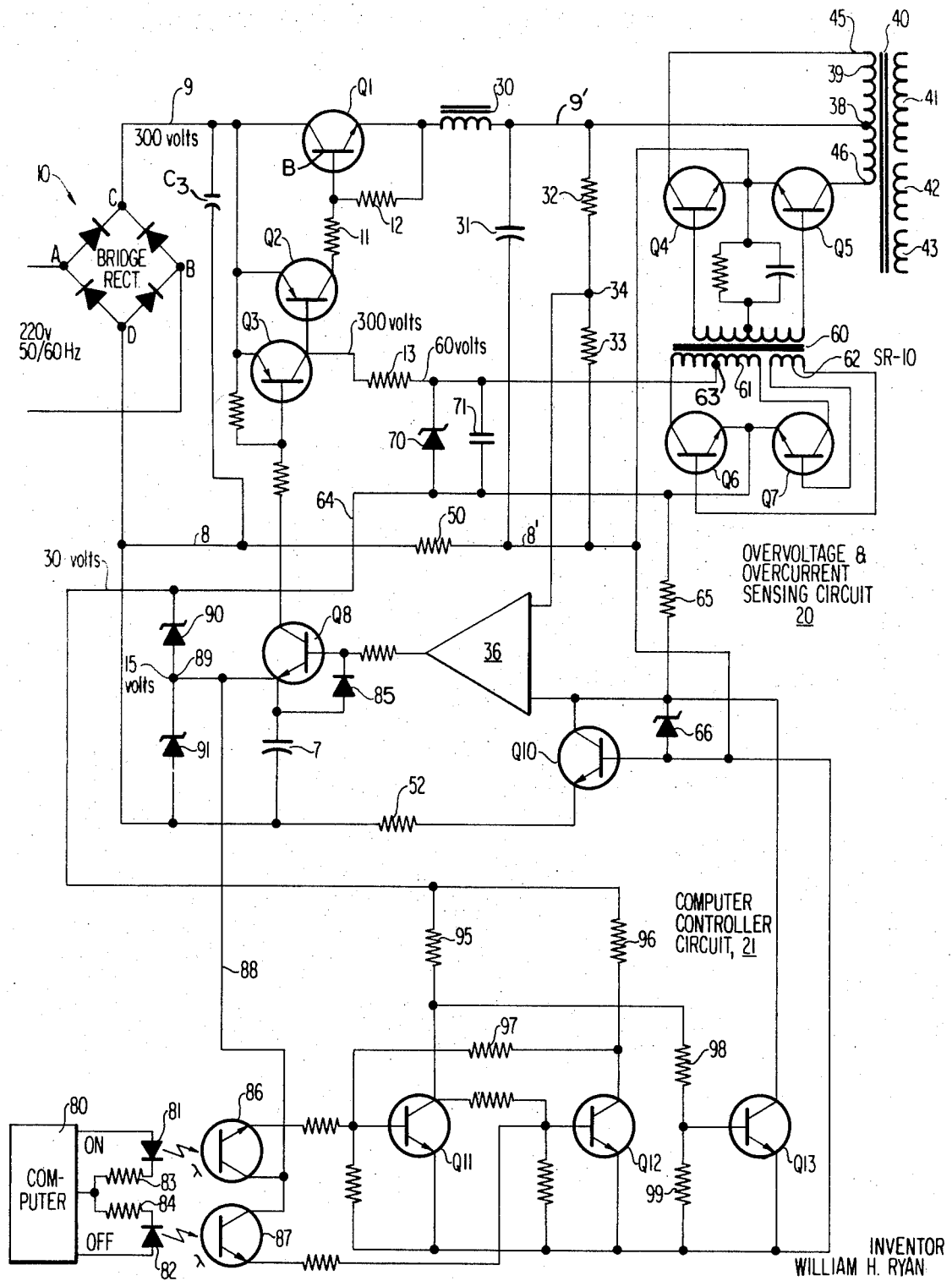

POWER SUPPLY SYSTEM AND CONTROL CIRCUITS THEREFOR

The present invention relates to solid state power supply systems and particularly those concerned with supplying operating potentials to a gas discharge display panel system wherein signals locating cross-point matrices in the panel are supplied with signals from the computer and wherein low voltage logic signals from the computer are isolated by means of optical couples for turning on and turning off the power supply to thereby turn on and turn off the display panel.

BACKGROUND INFORMATION AND BRIEF DESCRIPTION OF THE INVENTION

There are, of course, many power supply systems currently available which provide current and voltage regulation in a relatively inexpensive and expeditious manner. The general principles for a large number of these as well as the instant power supply may be found in the "Handbook of Selected Semi-Conductor Circuits NOBSR 73231," issued by the Bureau of Ships, Department of the Navy, NAV Ships No. 93484, Section 8, entitled "A-C to D-C Power Supplies," attention being invited particularly to the voltage regulators in Section 1 "Design Philosophy" (b) Regulated Power Supplies and a switching regulator of the type used in this invention is described in detail in an article entitled "Need to Design a Switching Regulator," *Electronic Design*, Jan. 4, 1970 at page 106, there being many articles and publications. It will be appreciated that the present invention is directed to the improvements on various aspects of the circuitry there shown, important features of which are as follows:

1. Whereas it is well known to use a zener diode for sensing voltage variations across the output of a regulated direct current supply and apply same through a differential amplifier to thereby operate a control or switching transistor in the base circuit of a regulating or switching transistor to vary the duty cycle thereof, and this is incorporated in the present invention, the present invention, in addition, includes a further switching transistor operated by a current overload sensing circuit to thereby shunt the zener reference diode and hence remove or disconnect the load from the supply by way of the regulating switching transistor.
2. Similarly, a still further switching transistor is connected in shunt with the zener reference diode, the further switching transistor being connected to a bistable flip-flop circuit. The bistable flip-flop circuit receives control signals setting it from one stable state to another stable state, these different stable states of the flip-flop being controlled by means of low voltage logic signals from a computer or other low voltage control source. These logic signals are isolated from the computer circuit by way of optical couples. Except for the effective opening and closing of the regulating transistor, the load is normally connected to the source.
3. Operating potentials and power for the second or saturable core oscillator as well as operating potentials for other elements of the control circuit are derived from a source in the regulator circuit per se which thereby enhances the efficiency of the system.

BRIEF DESCRIPTION OF THE INVENTION

Referring now to the drawing, there is diagrammatically illustrated a bridge rectifier 10 which receives its input alternating potential on terminals A and B thereof from a 220 volt 50/60 Hz supply (for example) and delivers a high voltage (300 volts for example) which is applied to a filter circuit C3. This output voltage is applied through a regulator constituted by switching regulator transistor Q1 which has its collector-emitter circuit connected in series with the output line. As in the regulator shown and described in Electronic Design, transistor Q1 is not operated in the linear range. Thus, control potentials applied to the base electrode B of transistor Q1 serve to regulate the output voltage by varying the duty cycle, the duty cycle increasing with demand. It will be noted that in the base circuit of transistor Q1 is a pair of transistors Q2 and Q3, with transistor Q2 having its collector connected through a small dropping resistor 11 to the base B of transistor Q1. (A small resistor 12 is connected between the emitter-base electrodes of transistor Q1 to rapidly bring transistor Q1 out of saturation). The emitters of transistors Q2 and Q3 are connected commonly together and to the collector electrode of transistor Q1, it being noted that transistor Q1 and Darlington connected transistors Q2–Q3 are of opposite conductivity types so with the polarities being observed, proper operating potentials are applied to the base of transistor Q1.

It will also be noted that the collector of transistor Q3 is connected through a dropping resistor 13 described hereinafter, which constitutes the source of supply potential for saturable reactor oscillator SR–10, overvoltage and overcurrent sensing circuitry 20 and computer control circuitry 21, which circuits operate in the manner to be detailed hereinafter. However, for the time being, it will be noted that the output voltage from transistor Q1 is applied through a series inductor 30 and shunt capacitor 31 which together constitutes a filter for eliminating any ripple voltage from the circuit. (In order to protect transistor Q1 a pair of diodes, one in shunt with the emitter-collector electrodes and one in shunt with the output terminals are provided, it being understood that a number of these conventional expediencies have been deleted so as to better illustrate applicant's invention). The output voltage is applied across a voltage divider constituted by resistors 32 and 33, the intermediate point of which is applied as one input to a comparator circuit, as for example, differential amplifier 36. The high voltage line 9' is connected to the center tap 38 of the primary winding 39 of linear or non-saturating power transformer 40, transformer 40 having a plurality of secondary windings 41, 42 and 43, from which may be developed a plurality of separate outputs, if desired, each of which may be rectified by rectifiers, not shown, and regulated by other regulator circuits, not shown.

The upper end 45 of primary winding 39 is connected to the collector electrode of transistor Q4 whereas the lower end 46 of primary winding 39 is connected to the collector electrode of transistor Q5. The emitter electrodes of transistors Q4 and Q5 are commonly connected together and to return line 8' which returns via current sensing resistor 50 and common line 8 to terminal D of bridge rectifier 10. It will be recognized that transistors Q4 and Q5 as connected with respect to primary winding 39 and intermediate or center tap 38 constitutes a push-pull switching transistor pair. The switching potentials applied to the base electrodes of transistor Q4 and transistor Q5 are derived from a saturable core oscillator or inverter SR–10. Inverter SR–10 is, per se, conventional as is illustrated in the above referenced articles. For the purposes of the present application, it will be noted that it is constituted by a saturable core reactor 60 having a center tapped primary winding 61 and feedback winding 62, the opposite ends of primary winding 61 being connected to the collector electrodes of a further pair of switching transistors Q6 and Q7. (The conversion from DC to AC using a linear converter driven by a saturable core inverter is well known and reference is made to page 451 et seq. of the McGraw Hill text entitled "Transistor Circuit Design").

It will be noted that the center tap 63 of transformer primary 61 is connected to the lower end of resistor 13. Thus, the saturable reactor inverter circuit SR–10 is connected between the intermediate point or center tap on transformer 61, the commonly connected emitter electrodes of transistors Q6 and Q7 are, in effect, supplied by the potential difference between these two points. It will be noted that the line 64 connected to the emitter electrodes of transistors Q6 and Q7 is returned to the supply lines 8' via resistor 65 and reference zener diode 66 as well as by a parallel path through computer control circuit 21. A starting circuit connected between the center tap on primary winding 61, a center tap (not shown) of feedback winding 62 and the common connection between the emitter electrodes for transistors Q6 and Q7 provides a starting potential to inverter circuit SR–10. Such a starting circuit may be similar to the diode self-starting circuit shown in FIG. 90.7 of the above-cited "Handbook of Selected Semiconductor Circuits." There are other starting circuits which may be used. Shunt zener diode 70 has a high voltage rating and does not normally conduct; its purpose is to protect transistors Q6 and Q7 in the event of a failure to start oscillating by-pass capacitor 71 connected in parallel with zener 70. As is well known, the mode of operation of saturable reactor inverter or oscillator 20 is well known and is well described in the art. Basically, these oscillator circuits are constituted by transistors Q6 and Q7 operating in a push-pull circuit with the main transformer windings and feedback windings arranged to provide positive feedback from the collector of each transistor to its emitters.

VOLTAGE AND CURRENT REGULATION

As described earlier, the voltage divider constituted by resistors 32 and 33 is connected between the output terminals to the load (in this instance, transformer 40 and push-pull or switching transistors Q4 and Q5), the intermediate point of the voltage divider being connected to serve as one input to differential amplifier 36 the output of which operates a switching transistor Q8 to thereby manipulate the base potential to transistor Q3 and in turn the control signal applied to switching or regulating transistor Q1. This voltage variation at intermediate point 34 is compared against the voltage applied or produced by zener reference device 66. It will be noted that zener 66 receives its voltage via resistor 65. It will be recognized that differential amplifier 36 produces a control signal output when the voltage at intermediate points 34 depart from a level of voltage established by reference zener diode 66, so there will be a controlled effect or function exerted upon the base electrode of Q1 to thereby control the voltage supplied to the load and in this respect; this aspect of the circuitry is conventional (see Electronic Design, supra). However, it will be noted that overcurrent control transistor Q10 has its base-emitter circuit connected across current sensing resistor 50 which is in the return path from the load and hence the voltage developed across resistor 50 is proportional to current to the load. This voltage is also compared against a reference voltage established by base-emitter voltage of transistor Q10 so that when this voltage (on resistor 50) rises above a selected level, transistor Q10 is switched on to thereby shunt zener reference 66 to thereby produce an overvoltage signal, in effect, to differential amplifier 36, which, in turn, operate transistor Q8 to thereby exert a control effect, e.g., open transistor Q1. The operating potentials to differential amplifier 36 are not shown in the drawing as these may be derived from the secondary sources described herein. Resistor 52 is a current limiting resistor. It should be understood that the overcurrent or overload control function, in the present embodiment, is generally effective for gross overloads and is not a precision current control. However, the principle of shunting the zener reference on current overloads may be applied to precision current control systems if desired.

COMPUTER CONTROL OF POWER SUPPLY

As mentioned elsewhere herein, the power supply was developed primarily for supplying operating potentials to a gas discharge display panel of the type disclosed in Baker et al. U.S. Pat. No. 3,499,167 and, in particular, high voltages developed herein are used to supply the sustaining generators as well as the high voltage pulse generators and low voltage logic circuits. However, the present invention is not concerned with the interfacing circuitry at the panel, per se, but is concerned with the use of low voltage logical control signals from a computer, for example, so as to turn on the power supply without interfering with the operation of each other. Accordingly, and in accordance with the present invention, the computer, diagrammatically illustrated as 80 in the drawing, is shown as having a pair of signals which are labeled "on" and "off" and which are applied to light emitting diodes 81 and 82, respectively, each connected through a dropping resistor 83 and 84, respectively. As diagrammatically illustrated, the light emitted by these diodes is directed upon a phototransistor in a shielded container so these elements constitute a commercially available optical couple (Monsanto Co., No. MCT2). Hence, the computer circuits are isolated from the power supply circuits and the power supply has no adverse feedback effects on the computer circuitry.

As illustrated, operating potentials for the phototransistors 86 and 87 are supplied by way of commonly connected collectors which are connected in turn via lead 88 to the midpoint 89 of a pair of zener diodes 90 and 91. It will be noted that the anode of zener diode 91 is connected to common conductor 8 (which, it should be noted, is not ground) whereas the cathode of zener diode 90 is connected to the center point between the emitters of transistors Q6 and Q7 and hence provides some voltage regulation.

Transistors Q11 and Q12 are connected in a conventional bistable flip-flop circuit, each having its collector resistor 95 and 96, respectively, connected to the source of supply or operating potential therefor (e.g., the lower end of the circuit from resistor R13) and with their emitters commonly connected together and to conductor 8'. The input signal to the base of transistor Q11 is developed at the emitter of phototransistor 86, whereas the base signal to transistor Q12 is derived at the emitter of phototransistor 87; the collector of transistor Q12 is connected via feedback resistor 97 to the base electrode of transistor Q11. An output signal voltage is developed at the collector of transistor Q11 and applied across a voltage divider constituted by resistors 98 and 99, the intermediate point of which serves as a source of control signal for transistor switch Q13. Transistor switch Q13 has its emitter-collector circuit connected in shunt across zener diode 66 so that when this transistor is rendered conductive, there is an output signal from differential amplifier 36 which renders transistor Q8 non-conductive thereby open circuiting transistor Q1 in effect thereby disconnecting the load from the bridge rectifier 10. This operation is substantially similar to the operation of Q10 in its disablement of zener diode 66. In both cases, the potential at the intermediate point 34 is sufficient to provide an output signal to ultimately open transistor Q1. Thus, by setting the stable state of the bistable flip-flop constituted by transistors Q11 and Q12 to one stable state or the other the entire power supply system is turned on or off, relative to the load by way of the low level logic signals from the computer.

SUPPLY TO CIRCUITS 20 AND 21

The current through the emitter-collector circuit of transistor Q3 can be relatively high so, to avoid wasting this power, it is used to operate a portion of the overload-overcurrent 20 and the computer control circuit 21. As illustrated, the input to transistor Q1 (and at the emitter of Q3) can be about 300 volts and the drop across Q3 insignificant so the voltage at the collector of transistor Q3 can be at 300 volts. Resistor 13 is chosen to drop this voltage to about 60 volts (e.g., a 240 volt drop in resistor R13) at the lower end of this resistor. Inverter SR-10 causes a drop of about 30 volts; and zener diodes 90 and 91 are about 15 volts each. The voltage at the emitter (point 89) of transistor Q8 is at the 15 volt level which is the operating voltage for the phototransistors 86 and 87. Diode 85 is conventional and is connected between the base and emitter electrodes of transistor Q8 to prevent damage to this transistor in the event of back biasing. Capacitor 7 has a relatively large capacitance and in addition to filtering operates with transistor Q8 in the manner described in the Electronic Design article cited above.

SUMMARY OF THE MAIN FEATURES OF THIS INVENTION

While a number of aspects of the present invention are in the prior art, those novel features which are believed to be important contributions to the art may be summarized briefly. While the use of zener devices as a reference means for comparison with the output voltage of the power supply and controlling a switching regulating transistor Q1 is known in the art, improvements to this control system incorporated in applicant's invention are constituted by the use of optical couples to provide control signals for operating transistor switch Q13 to shunt the zener reference 66 to turn "off" or turn "on" the power supply. As another feature, a second switching transistor Q12 has been effectively connected so as to shunt the reference zener diode 66 and on a change in current to the load as sensed by a conventional current sensing resistor 50, it is operated to shunt or bypass the zener reference 66 and thereby exert an additional control by way of the switching regulating transistor Q1 and its associated circuitry. As a further feature, the regulating circuitry of the switching transistor may sometimes be wasteful of power as identified by the current through control transistor Q3 and collector resistor R-13. In accordance with the invention, however, the solid state inverter, constituted by saturable reactor SR-10 and push-pull switching transistors Q6 and Q7 are used as a load on this circuit and receive its power therefrom. At the same time, zener 66, differential amplifier 36 as well as the control circuitry 21 constituted by a bistable flip-flop circuit and the differential amplifier also receive operating potential from this source so that the efficiency of the system is improved.

It will be appreciated that the circuitry may be used with different conductivity type transistors where opposite polarity situations prevail without departing from the invention. Further minor circuit modifications may be employed. Hence, the foregoing specification is intended to illustrate a preferred form of the invention which may be employed in similar circuits without departing from the invention as defined by the following claims.

What is claimed is:

1. A control system for controlling the operation of a power supply system having a switching transistor regulator means connected with its emitter-collector circuit in series circuit between the input and output terminals of said power supply system, means for sensing voltage variations at said output terminals and producing a first control signal, said means for sensing including a zener reference device, means controlling said switching transistor voltage as a function of said first signal, the improvements comprising, a bistable control circuit,
a pair of low voltage solid state switch elements,
means connecting a first of said low voltage switch means to said bistable circuit to shift its state from a first stable state to its second stable state,
means connecting a second of said low voltage switch means to said bistable circuit to shift its state from said second stable state to said first stable state,
transistor switch means controlled by said bistable circuit, and means connecting said transistor switch means so as to enable and disable said zener reference and open and close said switching transistor regulator means in accordance with the stable states of said bistable circuit to thereby control application of power to said load.

2. The invention defined in claim 1 wherein said control system includes a computer, at least one output means for said computer producing low voltage "on" and "off" signals for said power supply, a pair of light emitting elements each connected to receive one of said "on" and "off" signals, respectively, and emit light and said low voltage switch elements including light detector elements arranged to constitute, with said light emitting elements, optical couples.

3. The invention defined in claim 1 including, as a part of said power supply system, means for sensing current to said load, the further improvement comprising,
   a further transistor switch means controlled by said current sensing means, and
   means connecting said further transistor switch means to disable said zener reference and open said switching transistor on said means for sensing current to said load sensing a load current above a selected level.

4. The invention defined in claim 3 wherein said current sensing means includes a series resistor connected to carry the current to said load and the voltage drop across said series resistor is proportional to current to said load,
   the further improvement wherein said selected level of load current is established by said zener reference.

* * * * *